United States Patent Office.

ISAAC L. HOARD, OF BRISTOL, RHODE ISLAND.

Letters Patent No. 108,595, dated October 25, 1870.

IMPROVEMENT IN THREAD-SPOOLS.

The Schedule referred to in these Letters Patent and making part of the same.

*To all whom it may concern:*

Be it known that I, ISAAC L. HOARD, of Bristol, in the county of Bristol and State of Rhode Island, have invented a new and useful Improvement in the "Art of Making Thread-Spools;" and I do hereby declare that the following specification is a full, clear, and exact description thereof.

The object of my invention in thread-spools is not only to produce them at a less expense than they are now manufactured, by the substitution of a cheap material for wood, but to render unnecessary the employment of the complicated and expensive machinery now in use for that purpose, and consists in the combination of certain substances, and the subsequent molding and hardening of the same, into spools.

I am well aware of the existence of machinery for the manufacture of spools so perfected and improved that the introduction of a piece of wood at one end results in the delivery of the perfect spools at the other; but in this case, as in all others, the use of such valuable machinery enhances the price of the manufactured article not only from the first cost of the same, but from the frequent repairs which automatic machinery requires.

I make use, in the first place, of plaster of Paris, which I reduce to a proper consistency for molding by the use of water, after which I mold the mass thus formed directly into spools, or first into cylinders, which are turned into spools.

If the spools thus made are not of sufficient hardness, I make them harder by soaking them in a glutinous solution.

For this purpose a variety of solutions may be used, for instance, naphtha and resin, or naphtha and shellac having a specific gravity from 760 to 1040, or thin solutions of gum, glue, silicate of soda, silicate of potash, pastes, and cements, each and all of these different solutions possessing for this purpose a common qualification.

It is not, however, necessary that the spools should be soaked in these solutions, but the mass itself may be mixed with them before molding.

These proportions may be varied in many ways, and others may be introduced at pleasure; for instance, plaster of Paris may be used with lime, in the proportion of three-fourths to one-half of the former to one-fourth to one-half of the latter; also, chalk, clays, clays and sand, or even sand alone, may be used with the solutions described.

If clays, or clays and sand are used, or sand alone, the spools may be hardened by baking or burning.

What I claim as my invention, and desire to secure by Letters Patent, is—

A thread-spool, molded from plaster of Paris, or any earthy substance, mixed with any desired glutinous solution to render it of sufficient hardness.

ISAAC L. HOARD.

Witnesses:
BENNETT J. MUNRO,
LEONARD G. SIMMONS.